US007873959B2

(12) United States Patent
Zhu et al.

(10) Patent No.: US 7,873,959 B2
(45) Date of Patent: Jan. 18, 2011

(54) PUBLISHING THE STATUS OF AND UPDATING FIRMWARE COMPONENTS

(75) Inventors: Yuhang Zhu, Bellevue, WA (US); Jeffrey M. Paul, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/141,864

(22) Filed: Jun. 1, 2005

(65) Prior Publication Data

US 2006/0174242 A1 Aug. 3, 2006

Related U.S. Application Data

(60) Provisional application No. 60/648,887, filed on Feb. 1, 2005.

(51) Int. Cl.
G06F 9/445 (2006.01)
(52) U.S. Cl. .................. 717/172; 706/20; 706/934; 717/170
(58) Field of Classification Search .......... 455/456–457
See application file for complete search history.

(56) References Cited

U.S. PATENT DOCUMENTS

| | | | | |
|---|---|---|---|---|
| 6,976,163 | B1 * | 12/2005 | Hind et al. | 713/156 |
| 7,146,609 | B2 * | 12/2006 | Thurston et al. | 717/170 |
| 7,203,745 | B2 * | 4/2007 | Sheehy et al. | 717/176 |
| 7,428,417 | B2 * | 9/2008 | Caspi et al. | 455/456.1 |
| 7,712,085 | B2 * | 5/2010 | McCollum et al. | 717/174 |
| 2003/0200541 | A1 | 10/2003 | Cheng et al. | |
| 2003/0217193 | A1 * | 11/2003 | Thurston et al. | 709/321 |
| 2003/0217357 | A1 | 11/2003 | Parry | |
| 2004/0193917 | A1 * | 9/2004 | Drews | 713/201 |
| 2005/0091635 | A1 * | 4/2005 | McCollum et al. | 717/174 |

FOREIGN PATENT DOCUMENTS

WO 0241141 A 5/2002

OTHER PUBLICATIONS

Russell, SJ and P Norvig. "Artificial Intelligence: A Modern Approach." 1995, Prentice-Hall, Inc. Chapter 2.3, pp. 34-45.*
IBM Research Disclosure Bulletin 421139, "Automatic Laptop Reconfiguration Based on a Location", May 1, 1999.*
Open Mobile Alliance, "Firmware Update Management Object", accessible at: http://www.openmobilealliance.org/ftp/Public_documents/DM/Permanent_documents/OMA-TS-DM-FUMO-V1_0-20050822-D.zip, Draft version updated Aug. 22, 2005, 36 pages.
European Search Report dated Dec. 15, 2008 for European Patent Application Serial No. 06100167.3, 3 Pages.
Chinese Office Action dated Dec. 19, 2008 for Chinese Patent Application Serial No. 200610004321.4, 13 Pages.
European Search Report dated Aug. 11, 2009 from European Application No. 06100167.3.

* cited by examiner

*Primary Examiner*—Tuan Q Dam
*Assistant Examiner*—Erika Kretzmer
(74) *Attorney, Agent, or Firm*—Woodcock Washburn LLP

(57) ABSTRACT

A read-only management object is created to contain information relating to firmware components that can be updated. This information includes a component identifier, a component version and a user-friendly name for the component. The information also includes a state identifier that indicates a state of a device that includes firmware components. Information from the management object can be used by other components as part of a firmware update process. An update management object is dynamically created to deliver an update package to the device. The update package can contain updates to multiple firmware components.

20 Claims, 12 Drawing Sheets

PUBLISHING THE STATUS OF AND UPDATING FIRMWARE COMPONENTS

CROSS-REFERENCE TO RELATED APPLICATION

This application claims benefit under 35 U.S.C. §119(e) from U.S. Provisional Patent Application Ser. No. 60/648,887, entitled "MEANS FOR PUBLISHING THE STATUS OF AND UPDATING FIRMWARE COMPONENTS" and filed on Feb. 1, 2005. The entirety of the aforementioned application is hereby incorporated by reference.

BACKGROUND

Computing devices, especially portable computing devices, such as laptop computers, personal data assistants (PDAs), and cellular telephones, among others, typically contain a set of machine-readable instructions, or code. Such instructions are usually stored on the computing device in a non-volatile storage area such as a flash memory or a read-only memory (ROM). By storing instructions in a non-volatile storage area such as a ROM, the operating instructions for the device can be preserved even when a supply of electrical power to the device is discontinued. Stored code in a non-volatile memory such as a ROM is sometimes referred to as firmware.

Manufacturers, owners, and users of these computing devices may, from time to time, need or desire to change the code stored in the ROM. Reasons for such changes include changes in functionality or security, or to correct defects in the code. To assist in this task, methods and devices such as version numbering, modularization, and communication protocols have been employed. However, the existence of different, and potentially incompatible, methods and devices to update firmware complicates the task of performing updates. Current systems and methods to update firmware fail to take into account underlying differences in firmware update systems or implementations and do not provide a uniform scheme for updating firmware across different systems or implementations.

SUMMARY

The following presents a simplified summary in order to provide a basic understanding. This summary is not an extensive overview. It is neither intended to identify key/critical elements nor to delineate scope. Its sole purpose is to present some concepts in a simplified form as a prelude to the more detailed description later presented. Additionally, section headings used herein are provided merely for convenience and should not be taken as limiting in any way.

A read-only management object is created to contain information relating to firmware components that can be updated. This information includes a component ID, a component version and a user-friendly name for the component. The information also includes a state identifier that indicates a state of a device that includes firmware components. Information from the management object can be used by other components as part of a firmware update process.

An update object is created to be sent to a mobile computing device. The update object includes information relating to available firmware component update packages and typically includes version, name, and location information. The location information is usually provided in the form of a uniform resource identifier. An update object can contain information about more than one available firmware component update package.

An update server can access information from a management object and identify a firmware component update package that is available to update firmware of a mobile computing device. The update server creates an update object and transmits that object to the mobile computing device. Information contained in the update object provides to the mobile computing device a location of the firmware component update package.

The disclosed and described components and methods comprise the features hereinafter fully described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such aspects and their equivalents. Variations of the specific implementations and examples presented herein will become apparent from the following detailed description when considered in conjunction with the drawings.

DETAILED DESCRIPTION

Figure 1:
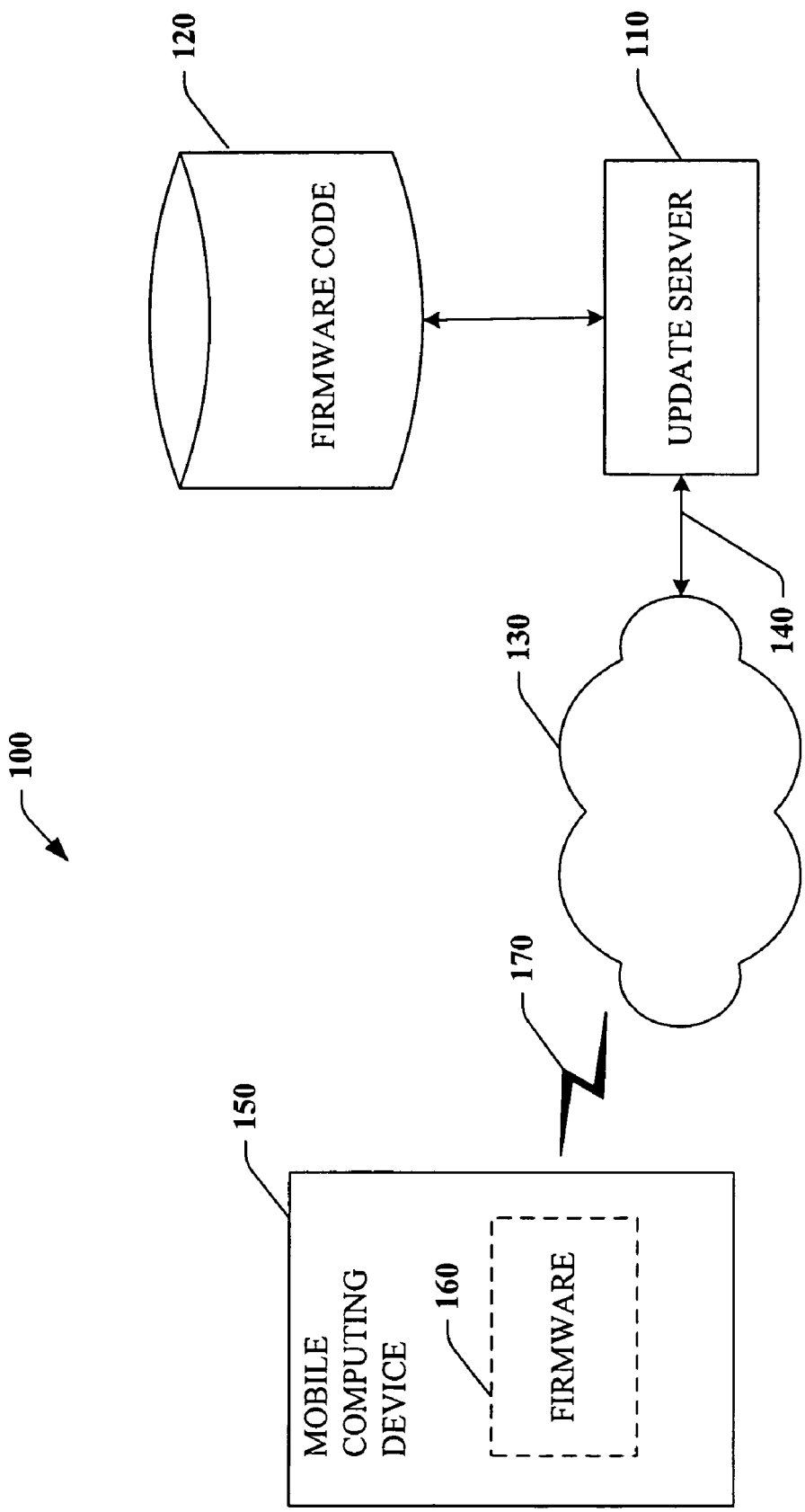
FIG. 1 is a system block diagram of a firmware update system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

FIG. 1 is a system block diagram of a firmware update system 100 in accordance with one aspect of the invention. The system includes an update server 110 that accesses a firmware code data store 120. The update server can be a dedicated server that is specifically designed for providing firmware updates or can be part of a more general information server, such as a web server. The firmware code data store 120 can contain information relating to firmware code versions as well as any updated code versions themselves. The update server 110 can be connected to a network 130 that includes wireless communication components. A communication channel 140 couples the update server 110 to the network 130 and can be a wired or wireless channel.

A mobile computing device 150 includes machine-readable instructions in the form of firmware 160. The mobile computing device 150 can also include wireless communication components, such as a transmitter, a receiver, or a combined transceiver, among others. The mobile computing device 150 is coupled to the network 130 by a wireless communication channel 170. The wireless communication channel 170 can be an IEEE 802.11x-based (WiFi) wireless connection or may be another suitable wireless communication channel. Among those wireless channels contemplated are IEEE 802.16 (WiMax), Bluetooth, infrared (IrDa), code division multiple access (CDMA), time division multiple access (TDMA), and global system for mobile communications (GSM) cellular telephone connections.

An example of the firmware update system 100 in operation follows. The mobile computing device 150 makes a wireless connection 170 with the network 130. The network 130 provides a connection 140 with the update server 110. The update server, using the established connections, accesses information regarding the firmware 160 that is currently present on the mobile computing device 150.

The update server 110 compares individual components of the firmware 160 that is currently installed on the mobile computing device 150 are compared against versions of firmware components for that device that are stored in the firmware code data store 120. If components of the firmware 160 installed on the mobile computing device 150 are current versions, no action is taken. If at least one firmware component for the mobile computing device 150 stored in the firmware code data store 120 is an upgrade or a newer version of a component of the firmware 160 stored on the mobile computing device 150, the mobile computing device 150 downloads the upgrade or newer version(s) from the update server 110 and replaces the currently-installed component. Further details of this scheme are discussed below.

Firmware is customarily separated into some number of individual packages or components, each of which is able to be individually updated, deleted, or replaced. Each package usually includes a package identifier, a version identifier and an update status identifier. In a simple possible update scheme, each described firmware component provides status information to a user or to an update server and provides for downloading updates and updating or replacing a specific component in its proper place in ROM. Frequently however, firmware updates require the updating or replacing of several distinct areas of a ROM image, each of which normally would be separately versioned. In such a scheme, updating using a standardized implementation, such as the implementation envisioned by the Open Mobile Alliance (OMA) firmware update (FUMO) specifications, requires multiple download and update cycles to individually update each affected section of the ROM image. This process leads to firmware packages that are "out of sync" because certain packages had been updated while others had not yet been replaced.

A solution is to split the status from the download and update behavior. This logical split permits standardized queries by mobile operator infrastructure for detection of firmware components that need to be updated while still allowing patches that include aggregations of code updates to be applied to ROM images. One possible implementation includes using standardized mobile operator infrastructure. In such a scheme, read-only management objects can be published to describe regions of a ROM image or firmware components that can be updated. The management object can be implemented as depicted by a schema shown in FIG. 2.

Figure 2:
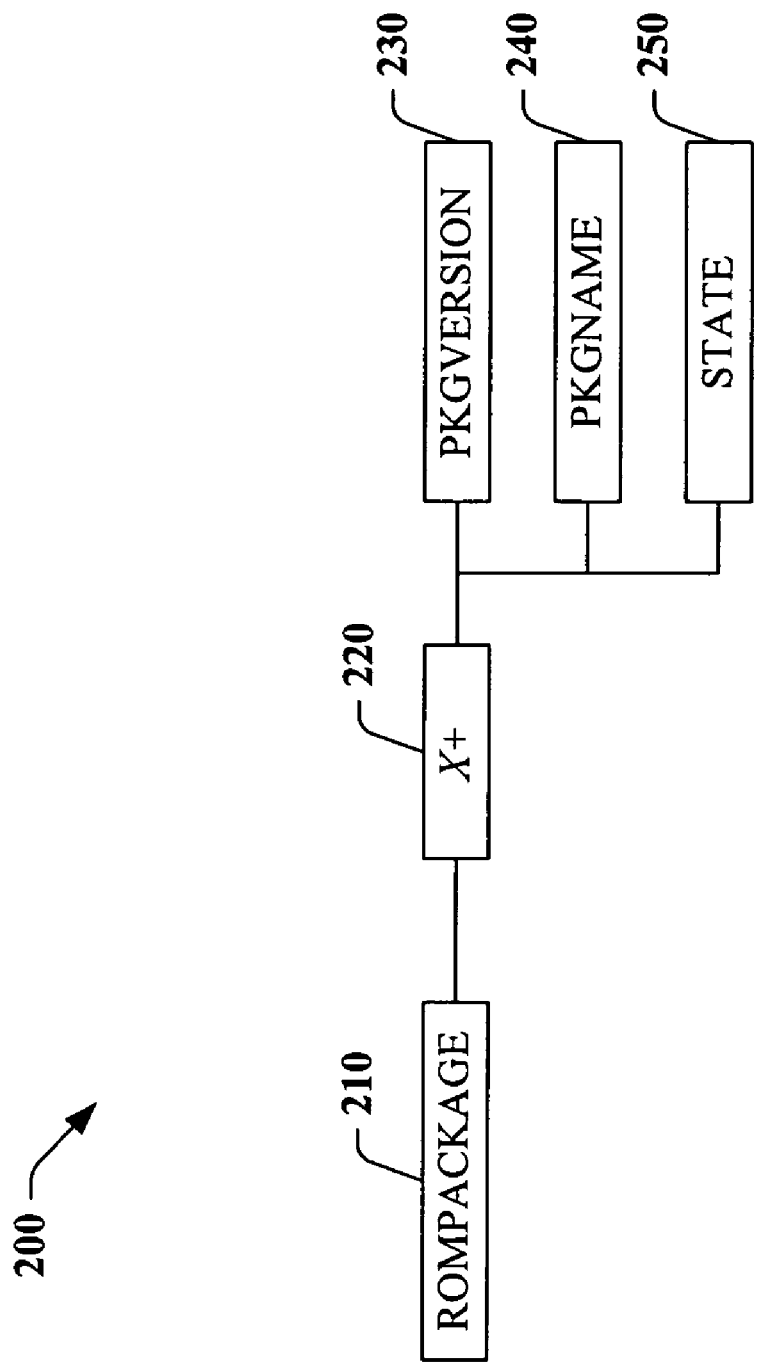
FIG. 2 is a schema diagram for a management object.

FIG. 2 depicts a schema for a read-only managed object 200. An object of this type can be managed as part of a device management tree, such as the OMA FUMO device management tree, among others. The read-only managed object 200 includes a ROMPackage node 210 at the root level. In accordance with this specific schema, there can be only one root level node. Those of ordinary skill in the art will recognize that other schemas with different numbers of nodes at a root level are possible.

In this example, the ROMPackage node 210 is a parent node at the root level that groups a ROM package identifier, which can be a globally unique identifier ("GUID"), together with version and name information. The GUID can be an alphanumeric identifier, a binary identifier, a hexadecimal identifier, or another appropriate identifier. As shown in this specific schema, the ROMPackage node 210 is required and is limited to a single instance located at the root level. It should be noted that further discussion of this schema occasionally refers to certain components as required or limited in some fashion. When such references are made, those references are for a specific example only and do not imply that deviation from a specific implementation provided as an example is not possible.

The next level includes at least one x+ node 220 that contains a package identifier. The package identifier can be an alphanumeric identifier, a binary identifier, a hexadecimal identifier, or another appropriate identifier. For simplicity, only a single x+ node 220 is shown. However, multiple x+ nodes 220 are not only possible, but envisioned. Each x+ node 220 in this example includes one PkgVersion node 230, one PkgName node 240, and one State node 250. Further discussion of these components follows.

Each x+ node 220 represents an identifier of a specific ROM package. A value included in the x+ node 220 is a GUID that can be an alphanumeric identifier, a binary identifier, a hexadecimal identifier, or another appropriate identifier. The x+node 220 serves to group other lower-level nodes that contain further descriptive information about the ROM image to which it relates. Specifically, each x+ node 220 can serve as an identifier for a discrete portion of a ROM image that can be treated as a single and separable unit apart from the entire image.

The PkgVersion node 230 includes version information for a portion of the ROM image, specifically, for a package of the ROM image. Version information can be provided in any suitable format, specifically including an alphanumeric string, a binary identifier, or a hexadecimal identifier. In this specific example, only one PkgVersion node 230 is allowed in a group designated by an x+ node 220. However, those of ordinary skill in the art will readily recognize that other schemes are possible. Among those schemes contemplated are those that include multiple version identifiers in cases where a package can replace more than one existing package and those that include sub-versions or special versions such as versions that are intended for a specific use such as gaming or videoconferencing, among others. In the case of sub-versioned or specially versioned components, a specially formatted identifier that is associated with a sub-version or special version can be used. Additionally or alternatively, the example schema presented can be extended to include a node for sub-version or special version identification.

One benefit of the schema presented herein is its extensibility. The example schema presented provides a base-level framework from which further development, including development of extensions, can be based. It should be noted that the base schema can be extended in a variety of ways that can be universally applicable, highly implementation-dependent, or somewhere in-between.

The PkgName node 240 includes a name of the ROM package. In this example, the name is human-readable and is a character or alphanumeric string. However, the name of the ROM package can be represented in alternate ways, specifically including a non-human-readable alphanumeric identifier, a binary identifier, a hexadecimal identifier, or another appropriate identifier. Although in this example only one PkgName node 240 is provided for each x+ node 220, more than one can be used in a specific implementation.

The State node 250 contains a value for the state of the mobile device for the package. This value can be implementation-dependent and can be used to store state information for the mobile computing device. For example, a value can be set in the State node 250 that indicates that an update was successful and that old data have been deleted. Similarly, a value can be set that indicates that an update attempt has failed and that old data have been retained. A wide variety of other state descriptors and values can be created and used.

Figure 3:
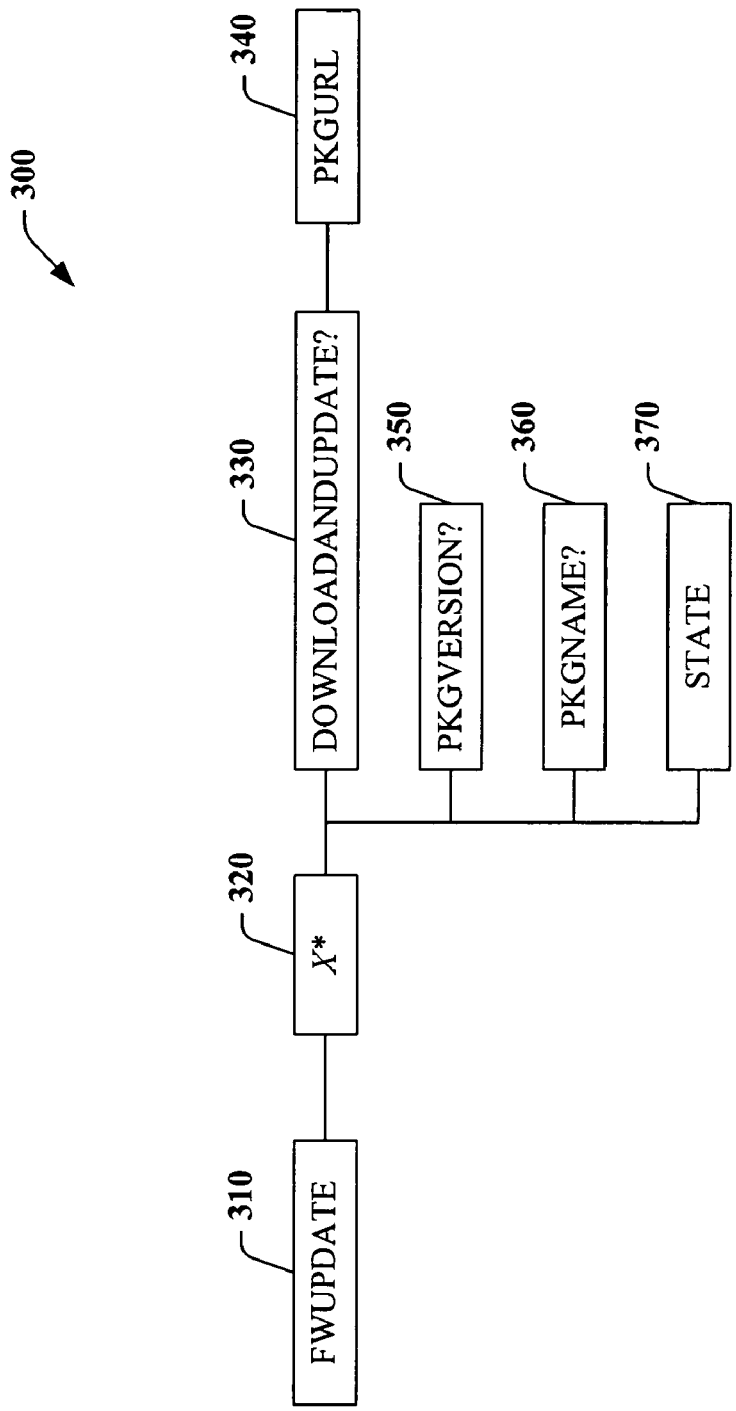
FIG. 3 is a schema diagram for an update object.

FIG. 3 is a schema diagram of an update object 300 in accordance with an aspect of the invention. In this example, an instance of the update object 300 is created dynamically at runtime depending upon specific updates to be applied. As with the object schema discussed with reference to FIG. 2, the update object can also be handled according to the OMA FUMO system or another suitable system. The object includes a FwUpdate node 310 at the root level. In accordance with this specific schema, there can be only one root level node. However, in other implementations, more than one root-level node can be used. Those of ordinary skill in the art will recognize how the schema presented can be modified for a particular needs of an specific implementation.

The next level includes an x* node 320 that includes a package identifier. For clarity, a single x* node 320 is shown. However, it is contemplated that multiple x* nodes 320 can and will be used. In this example, the package identifier of the x* node 320 is a GUID of an image update package. The GUID can be an alphanumeric identifier, a binary identifier, a hexadecimal identifier, or another appropriate identifier.

Each x* node 320 represents an update package of a ROM image. The represented update package can contain information to update multiple ROM packages. Each x* node 320 includes a DownloadAndUpdate node 330 that itself contains a PkgURL node 340. The DownloadAndUpdate node 330 can contain boolean data. The PkgURL node 340 can contain location information, such as a uniform resource locator ("URL") for the package to be downloaded and applied as a firmware update.

The x* node 320 also includes a PkgVersion node 350. The PkgVersion node 350 includes version information for the image update package. This version information can be human-readable, as in the case of a character string, or can be in a machine-readable format such as a binary code. Other suitable formats for the version information can be used. Additionally, sub-version or special version information can be included as part of the presented schema or as an extension to this schema.

The x* node 320 also includes a PkgName node 360. In this example, the PkgName node 360 includes a user-friendly name of the ROM package. As with other examples presented here, the name can be represented in a variety of formats that can themselves vary depending upon a specific implementation.

A State node 370 is additionally included under the x* node 320. The State node 370 contains a value for the state of the mobile device after an attempt to update ROM packages. This value can be implementation-dependent and can be used to store state information for the mobile computing device. For example, a value can be set in the State node 370 that indicates that an update was successful and that old data have been deleted. Similarly, a value can be set that indicates that an update attempt has failed and that old data have been retained. A wide variety of other state descriptors and values can be created and used.

Figure 4:
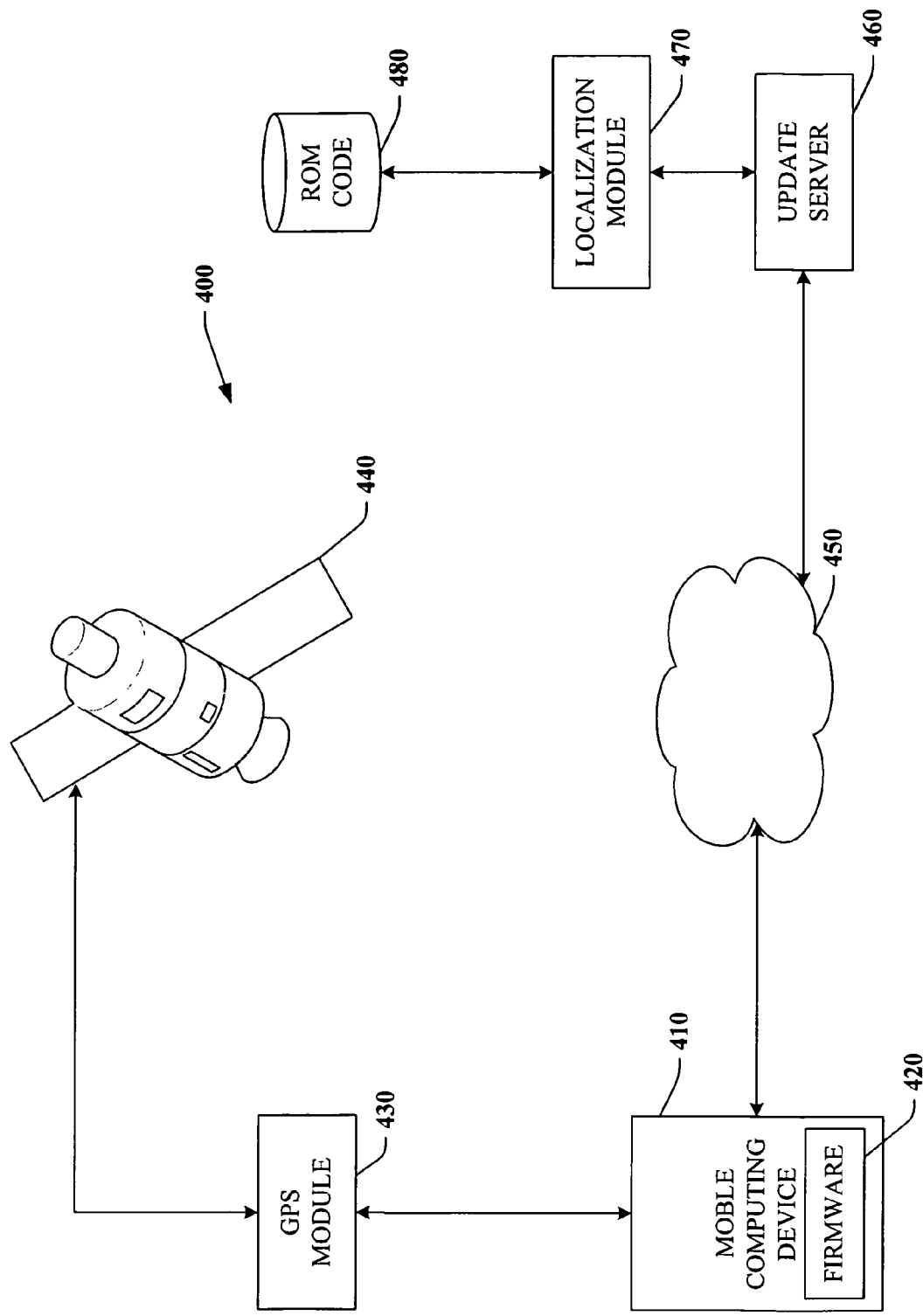
FIG. 4 is a system block diagram of a ROM update system including localization features.

FIG. 4 is a system block diagram of a ROM update system 400 including localization features in accordance with another aspect of the invention. Localization generally describes a process of adapting components of a computing device, specifically including software components, to reflect needs of a particular geographic location. Commonly, localization involves such things as adapting software to use a language spoken in a particular region. As used herein, localization also includes making operation-level changes to cause a computing device to operate differently in one geographic area than in another geographic area.

One example of such a functional change is in communication protocols. A mobile computing device can include hardware that supports multiple communication protocols. The device can use the TDMA protocol for wireless access to communication facilities while located within the United States. However, in Europe, the GSM protocol is primarily used. Therefore, a change in the ROM of the mobile computing device can cause the device to use GSM instead of TDMA when the mobile computing device is operating in Europe.

Similarly, a mobile computing device can support IEEE 802.11x (WiFi) communication along with other communication protocols. When the mobile computing device enters a WiFi hotspot, or another area served by a WiFi access point, the mobile computing device can update its ROM to cause the device to use the WiFi access point. Other examples of such switches between or among communication protocols will be apparent to those of ordinary skill in the art.

Another example includes adding or removing (or similarly, enabling or disabling) functionality of a mobile computing device according to geographic location. In the United States, strong encryption techniques can be used to secure electronic communications. Support for such techniques is typically not available in every geographic location. The mobile computing device can add or remove (or enable or disable) encryption features by updating its internal ROM image. Other examples of such functional modifications will be apparent to those of ordinary skill in the art.

The ROM update system 400 is intended to enable updates of ROM images of mobile computing devices according to geographic location of the mobile computing device. The ROM update system 400 includes a mobile computing device 410 that itself includes localized firmware 420. The mobile computing device 410 can be a cellular telephone, a personal information manager, a personal digital assistant, or another device. A global positioning system (GPS) module 430 is coupled to the mobile computing device and can access a GPS satellite 440. The GPS module 430 can use information from the GPS satellite 440 to determine a geographic location of the mobile computing device 410.

The mobile computing device 410 can access a network 450. The network 450 can be a wired or wireless network and in particular can be the Internet. The network 450 can connect to an update server 460. The update server can be a specialized file server, a web server that has been adapted for firmware update tasks, or another suitable type of server. However implemented, the update server 460 can communicate with, and in particular, send update information to the mobile computing device 410.

The update server 460 can access a localization module 460. The localization module 470 can use information from the GPS module 430 to determine appropriate localization information, such as a localized ROM image or portion thereof, to be sent to the mobile computing device 410. The update server 460 can access an appropriate ROM component specified by the localization module 470 from a ROM code data store 480. The ROM component from the ROM data store 480 can be sent by the update server 460 to the mobile computing device 410 using the network 450.

The disclosed and described components, for example in connection with localization or identification tasks, can employ various artificial intelligence-based schemes for carrying out various aspects thereof. For example, identification of a localized ROM component can be carried out by a neural network, an expert system, a rules-based processing component, or an SVM. Moreover, when more than one component can be used, a neural network other artificial intelligence-based component can assist in identifying a localized ROM component that provides a "best fit" based on predefined factors.

A classifier is a function that maps an input attribute vector, $X=(x_1, x_2, x_3, x_4, \ldots x_n)$, to a confidence that the input belongs to a class, that is, $f(X)$=confidence(class). Such a classification can employ a probabilistic and/or statistical-based analysis (for example, factoring into the analysis utilities and costs) to prognose or infer an action that a user desires to be automatically performed. In the case of ROM component replacement systems, for example, attributes can be file descriptors such as filenames, signatures, hash functions, upgrade codes, compatibility codes, version numbers, build numbers, release dates, or other data-specific attributes derived from the ROM files and the classes are categories or areas of interest, for example, descriptors of other ROM components that the device can use.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, the subject invention can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to determining whether a device should be sent data.

An example of operation of the ROM update system 400 follows. In use, the mobile computing device 410 accesses the GPS module 430 to obtain information about its geographic location. To obtain this information, the GPS module 430 accesses the GPS satellite 440 and calculates its geographic position based on information from the GPS satellite 440. The mobile computing device also accesses information about the localized firmware 420 in the form of one of the schemas or objects described above in conjunction with earlier figures.

The mobile computing device 410 sends the information about its geographic location and the localized firmware 420 over the network 450. That information is received by the update server 460. The update server 460 sends the geographic information and the information about the localized firmware 420 to the localization module 470. The localization module 470 uses the geographic information and the information about the localized firmware 420 to determine whether a replacement localized ROM component exists and whether that replacement localized ROM component should be applied.

If a replacement localized ROM component exists and should be applied, the localization module 470 provides identifying information about the replacement ROM component to the update server 460. The update server 460 obtains the component from the ROM code data store 480 and sends the component over the network 450. The mobile computing device 410 receives the replacement component from the network 450 and proceeds to update the localized firmware 420 with the replacement component.

Figure 5:
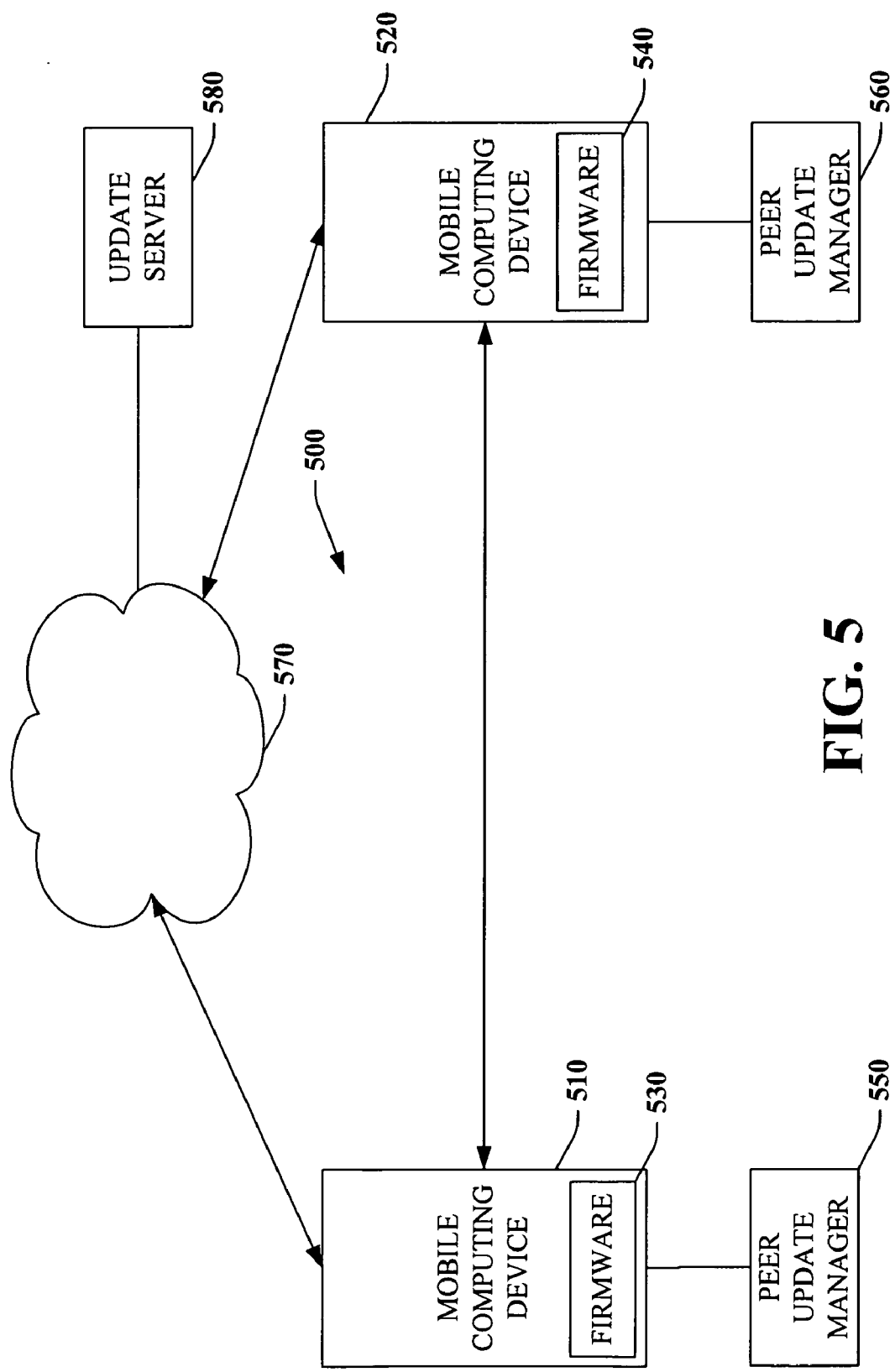
FIG. 5 is a system block diagram of a peer-based ROM update system.

FIG. 5 is a system block diagram of a peer-based ROM update system 500 in accordance with a further aspect of the invention. This peer-based ROM update system is intended to provide a means by which a mobile communication device can obtain a replacement ROM component directly from a second mobile computing device on a peer-to-peer basis. Such peer-to-peer functionality can be useful in circumstances when a mobile computing device cannot connect to a network to obtain ROM updates, such as when a portion of firmware of a mobile computing device is corrupted or malfunctioning, among other circumstances.

The peer-based ROM update system 500 includes mobile computing devices 510, 520. Each of the mobile computing devices 510, 520 includes a set of firmware 530, 540. Each of the mobile computing devices 510, 520 can also access an associated peer update manager 550, 560. The peer update managers 550, 560 can obtain descriptive information about firmware 530, 540 of the mobile computing devices 510, 520. That descriptive information can be published by the peer update managers 550, 560 to other mobile computing devices. A peer update manager associated with a mobile computing device, such as peer update managers 550, 560, can use the published information to determine whether firmware, such as firmware 530, 540, should be updated using the publishing mobile computing device as a source.

The mobile computing devices 510, 520 also can each access a network 570. Each mobile computing device 510, 520 can also use the network 570 to access an update server 580. Access to the update server 580 is provided as an additional or alternate means of obtaining updates. It is contemplated that the update server 580 will always have the most recent version of a ROM component for installation into firmware of a mobile computing device, but that is not necessarily the case. It is also the case that the update server 580 can obtain ROM components from a mobile computing device for distribution to other mobile computing devices that access the update server.

An example of a possible operational scenario follows. The mobile computing device 510 uses the network 570 to access the update server 580 to obtain an updated ROM component for installation into the firmware 530. The update server 580 determines that an update is available and sends that update to the mobile computing device 510. The mobile computing device 510 updates the firmware 530 with the new component and continues its operation.

The mobile computing device 510 uses the peer update manager 550 to publish information about its ROM components to the mobile computing device 520. The peer update manager 560 of the mobile computing device 520 compares the information published by the mobile computing device 510 with information about the ROM components of the firmware 540 of the mobile computing device 560. The peer update manager 560 uses this information to determine whether an updated version of a ROM component is available from the mobile computing device 510. If so, the peer update manager 560 obtains the updated component or components from the mobile computing device 510 and updates the firmware 540 of the mobile computing device 520.

Figure 6:
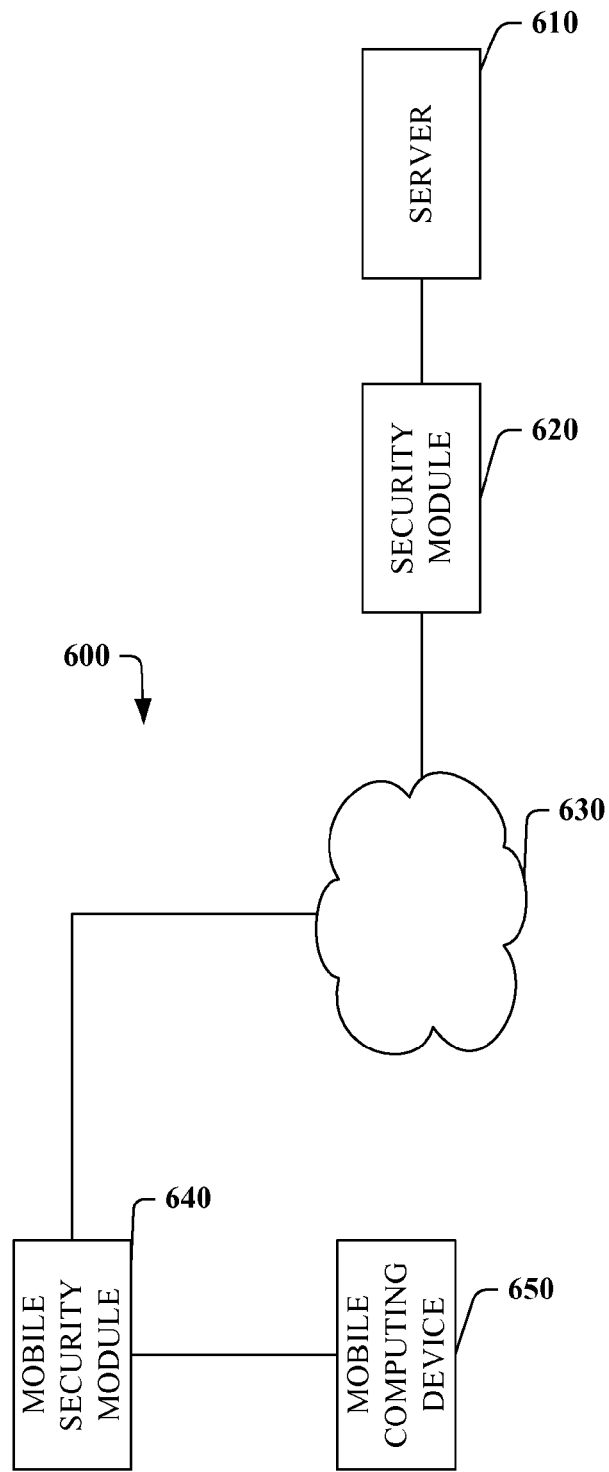
FIG. 6 is a system block diagram of a secure ROM update system.

FIG. 6 is a system block diagram of a secure ROM update system 600 in accordance with a still further aspect of the disclosed invention. The secure ROM update system 600 is intended to provide a platform that can protect the contents of ROM components used to update firmware of a mobile computing device and to verify identity of a source of such ROM components. A variety of approaches can be used to secure and verify ROM components. Some examples are discussed further below.

The secure ROM update system 600 includes an update server 610. The update server 610 can access a security module 620 that provides security and authentication functions for the update server 610. Such security and authentication functions can include applying digital signatures to electronic communications and encrypting such electronic communications. A variety of techniques can be employed to digitally sign or encrypt electronic communications. Those techniques include using a symmetric private key encryption algorithm, an asymmetric private-public key algorithm, or another suitable encryption scheme.

The update server can access a network 630 to communicate with a mobile computing device 650. The mobile computing device 650 can access a mobile security module 640 that is capable of interpreting electronic communications that are signed or encrypted by the security module 620 associated with the update server 610. Electronic communications interpreted by the mobile security module 640 can be forwarded to the mobile computing device 650 for use.

In operation, the mobile computing device 650 can send an update request to the mobile security module 640. The mobile security module 640 encrypts and digitally signs the request and forwards it to the network 630 for delivery. The network 630 forwards the request to the security module 620 which verifies the digital signature and decrypts the request. The security module 620 then forwards the request to the update server 610.

The update server identifies and sends an update package to the security module 620. The security module 620 encrypts and digitally signs the update package and then forwards the update package to the network 630. The network 630 forwards the update package to the mobile security module 640 which verifies the digital signature of the update package and decrypts the package. The mobile security module 640 then forwards the update package to the mobile computing device 650 that uses the package to update its firmware.

With reference to FIGS. 7-12, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 7:
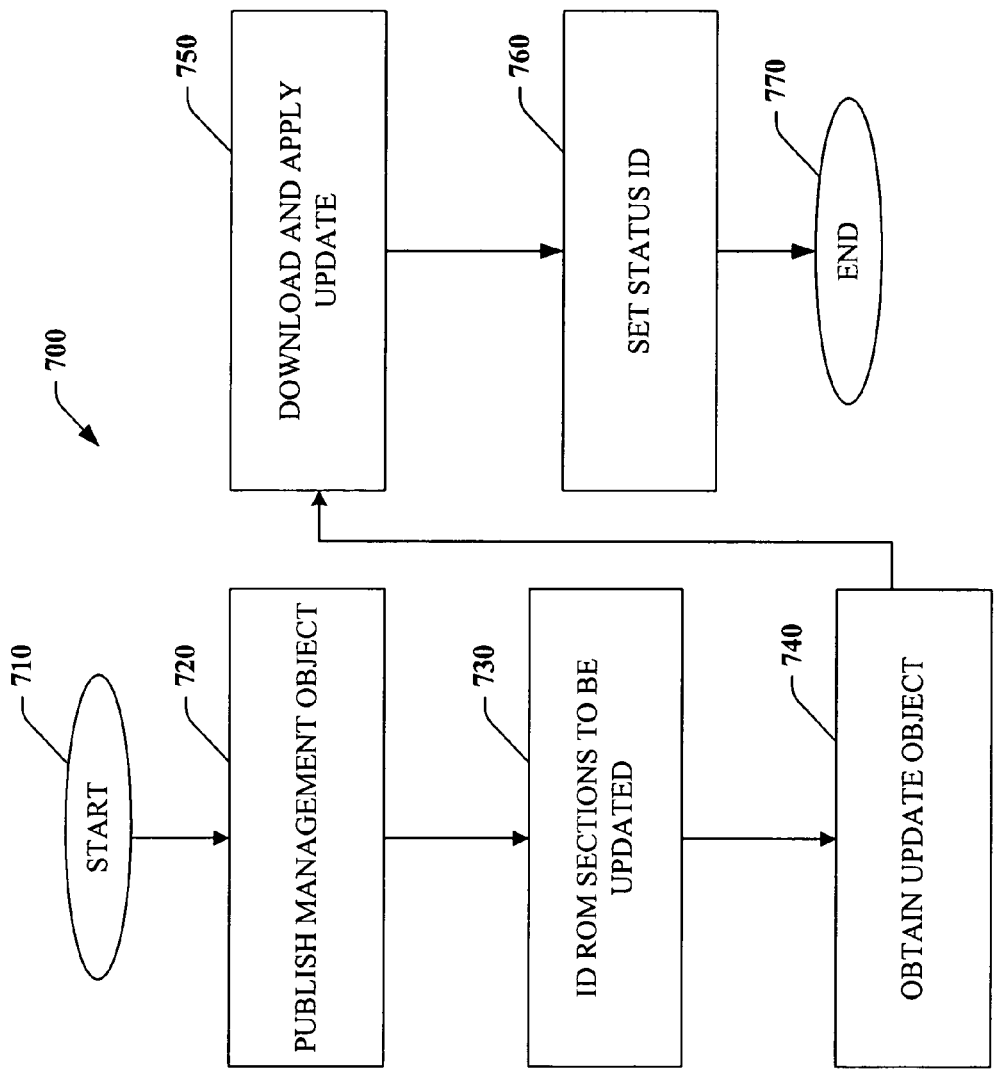
FIG. 7 is a flow diagram that depicts acts in a method that may be employed.

FIG. 7 is a flow diagram that depicts acts in a method for updating firmware components of a portable computing device 700 that may be employed in accordance with components that have been disclosed or described herein. Processing begins at START block 710 and continues to process block 720 where a management object is published. At process block 730, ROM sections for which newer or updated versions are available in a data store are identified as sections to be updated. Processing then continues at process block 740 where an update object is obtained from the data store. Actual updates are downloaded and applied to a ROM image of a device at process block 750. A status identifier that indicates a state of a device following an update attempt is then set at process block 760 and processing terminates at END block 770.

Figure 8:
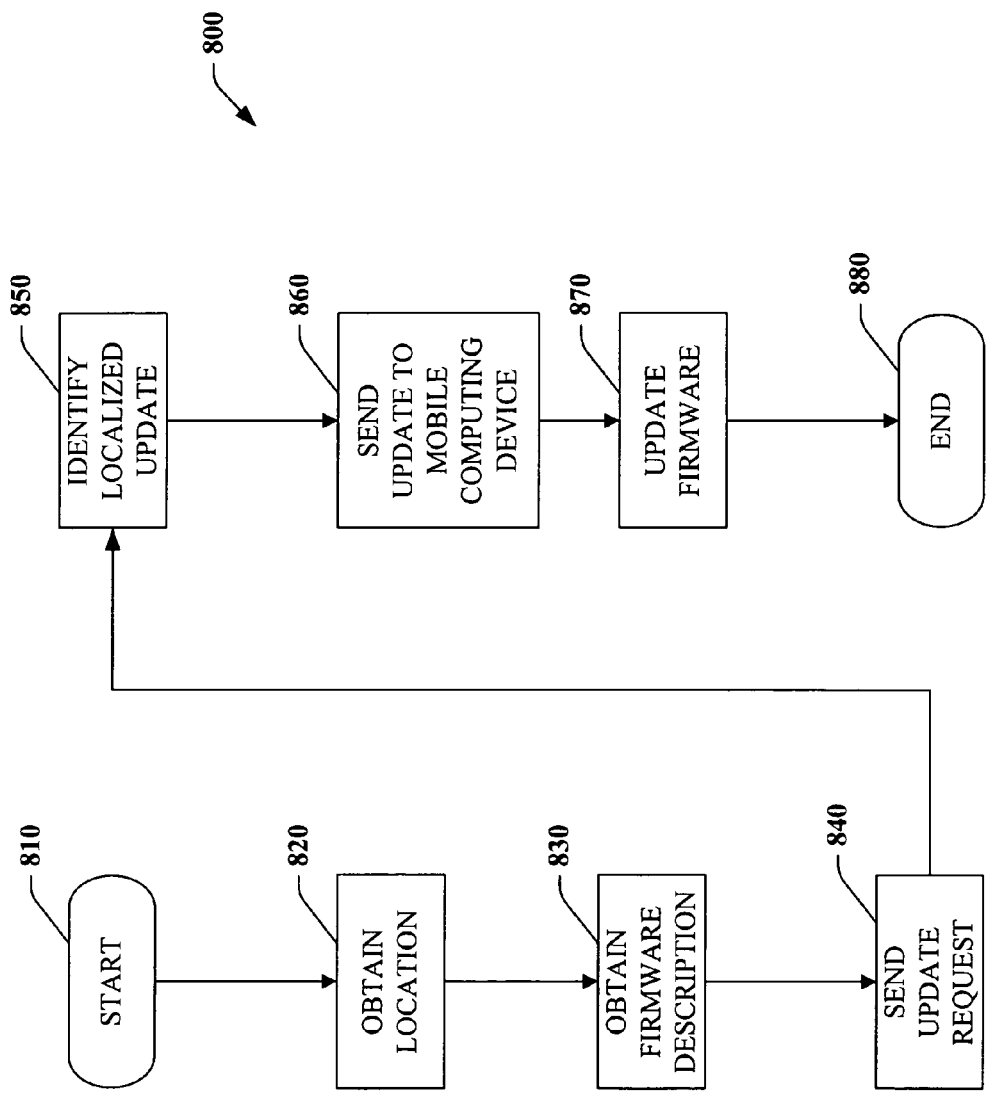
FIG. 8 is a flow diagram that depicts acts in a method that may be employed.

FIG. 8 is a flow diagram that depicts acts in a method for localizing firmware of a mobile computing device 800 that may be employed in accordance with components that have been disclosed or described herein. Processing begins at START block 810 and continues to process block 820. At process block 820, a geographic location of a mobile computing device is obtained. Geographic location information can be obtained automatically using a GPS system. Additionally or alternatively, such information can be manually entered by a user by typing a location, selecting a location from a map, selecting a location from among a set of locations in a menu, or by another suitable method.

Processing continues to process block 830 where a descriptor of firmware installed on the mobile computing device is obtained. Such a descriptor can be one of the descriptors that were described previously in conjunction with earlier figures or can be another suitable descriptor. An update request that includes the firmware descriptor and geographic information of the mobile computing device is sent to an update server at process block 840. These two pieces of information can be sent together as a single unit or can be separated.

At process block 850 the update server identifies an appropriate localized firmware update component from a component data store. The localized firmware update can be a complete ROM image or can be a component of a ROM image. Also, the localized firmware update can adjust functionality of the mobile computing device in any of the ways previously discussed in conjunction with other figures, among others. Processing continues to process block 860 where the update server sends the localized firmware update component to the mobile computing device. The mobile computing device uses the localized update component 870 to update at least a portion of its firmware. Processing concludes at END block 880.

Figure 9:
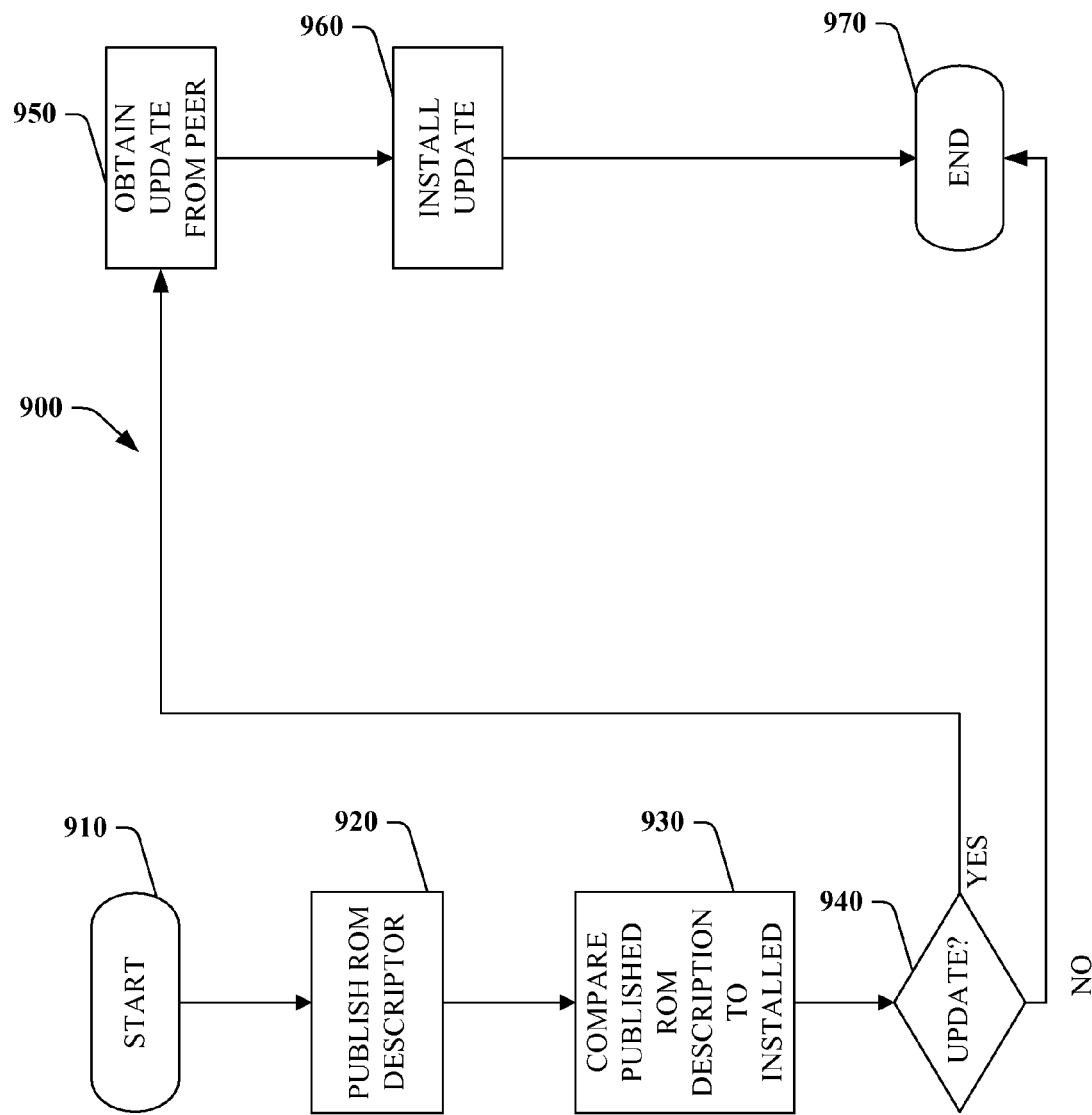
FIG. 9 is a flow diagram depicting processing of a method that can be employed.

FIG. 9 is a flow diagram depicting processing of a method for updating firmware of a mobile computing device 900 that can be employed in conjunction with components that have been disclosed or described herein. The method 900 is intended to provide a way in which firmware of a mobile computing device can be updated by accessing another mobile computing device, such as with peer to peer communications. Processing of the method 900 begins at START block 910 and continues to process block 920 where a mobile computing device publishes a descriptor of a ROM image that is installed in its firmware. This descriptor can be one of the descriptors as described in conjunction with a previous figure or can be another suitable descriptor.

Processing continues at process block 930 where a second mobile computing device compares the published ROM descriptor to a descriptor of a ROM image currently installed in the second mobile computing device. The descriptor of the currently installed ROM image of the second mobile computing device can be one of the descriptors that is described in conjunction with a previous figure or can be another suitable descriptor. At decision block 940 a determination is made whether the published descriptor is associated with a ROM component that can update a ROM component of the second mobile computing device.

If the determination made at decision block 940 is yes, processing continues to decision block 950 where the ROM component that can be used to upgrade is obtained from the first mobile computing device. The transfer of the component between devices, as with the publication of the descriptor, can use any of the wired or wireless communication protocols that the mobile computing device can support. Among the wired systems contemplated are universal serial bus ("USB"), IEEE 1394 (FireWire), serial, and parallel connections, as well as others. Wireless systems that can be used include WiFi, WiMax, CDMA, TDMA, GSM, Bluetooth, and others.

Processing continues at process block 960 where the obtained update component is installed into the firmware of the second mobile computing device. Installation can include a check or checks to ensure that the update process completed successfully. Processing terminates at END block 970. Similarly, if the determination made at decision block 940 indicates that an update component is not available from the other mobile computing device, processing terminates at END block 970.

Figure 10:
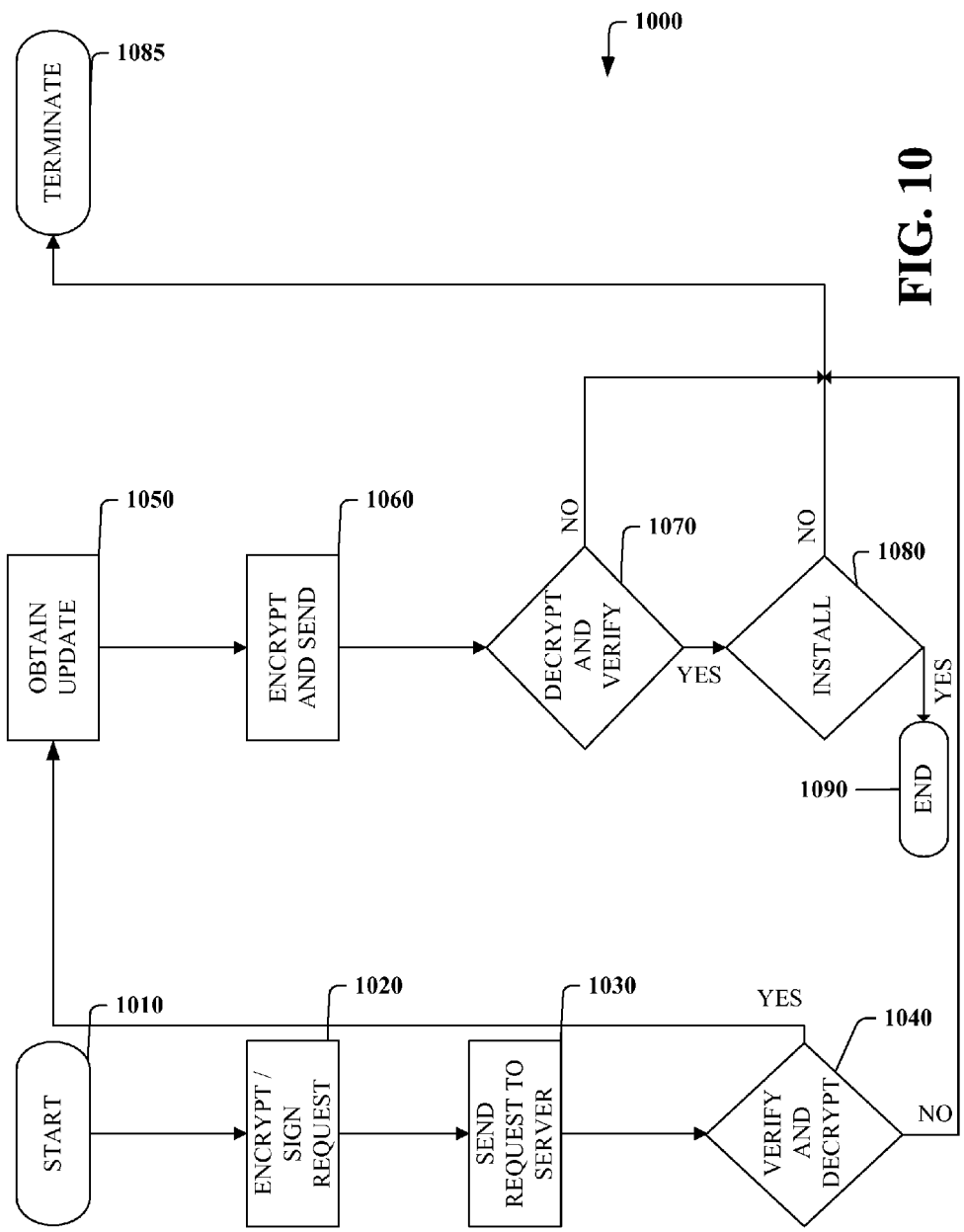
FIG. 10 is a flow diagram depicting processing of a method that can be employed.

FIG. 10 is a flow diagram depicting processing of a method for securely updating ROM components installed in firmware of a mobile computing device 1000 that can be employed in conjunction with components that have been disclosed or described herein. Processing of the method 1000 commences at START block 1010 and continues to process block 1020. At process block 1020, a mobile computing device constructs an update request that is encrypted and digitally signed. It should be noted that here, as with other places where encrypting and digitally signing are discussed, either of these techniques can be used alone or both can be used in combination.

Processing continues to process block 1030 where the now-signed and encrypted update request is sent to an update server. Sending the request can be accomplished through a direct connection to an update server, though a network connection to the update server, or through a connection with a peer that can take the place of an update server. At process block 1040 the server receives the update request and proceeds to verify the digital signature of the update request and decrypt the contents of the update request. At this point, a series of checks (not shown) can be instituted to ensure that the digital signature indicates that the request is authentic and that the request has not been tampered with in transit to the update server. If any of these checks fail, processing can conclude at TERMINATE block 1085.

At process block 1050, the update server identifies a ROM component that can be used to update firmware of the mobile computing device in accordance with information provided in the update request. The update server encrypts and digitally signs the upgrade component at process block 1060. Additionally, the update server sends the signed and encrypted ROM component to the mobile computing device.

At process block 1070, the mobile computing device receives the signed and encrypted ROM component and proceeds to verify the signature and decrypt the component. As with a similar process earlier, a series of checks (not shown) can be instituted to ensure that the digital signature indicates that the request is authentic and that the request has not been tampered with in transit to the update server. If any of these checks fail, processing can conclude at TERMINATE block 1085.

At process block 1080, the mobile computing device installs the ROM component to update its firmware. Installation can include checks (not shown) to ensure that the component was properly installed and is operational. Failure of any of these checks can result in another update attempt or can result in termination of processing at TERMINATE block 1085, among other things. Processing of the method 1000 concludes at END block 1090.

Figure 11:
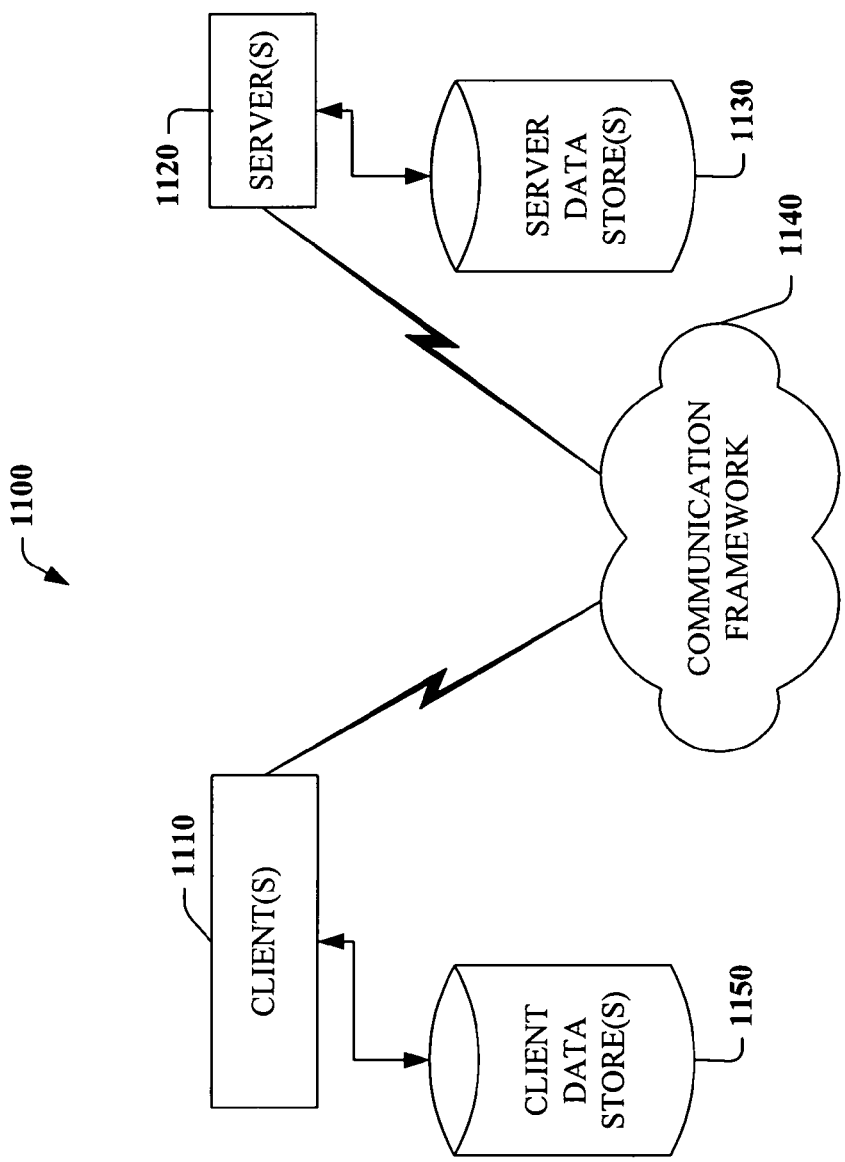
FIG. 11 illustrates an exemplary networking environment.
Figure 12:
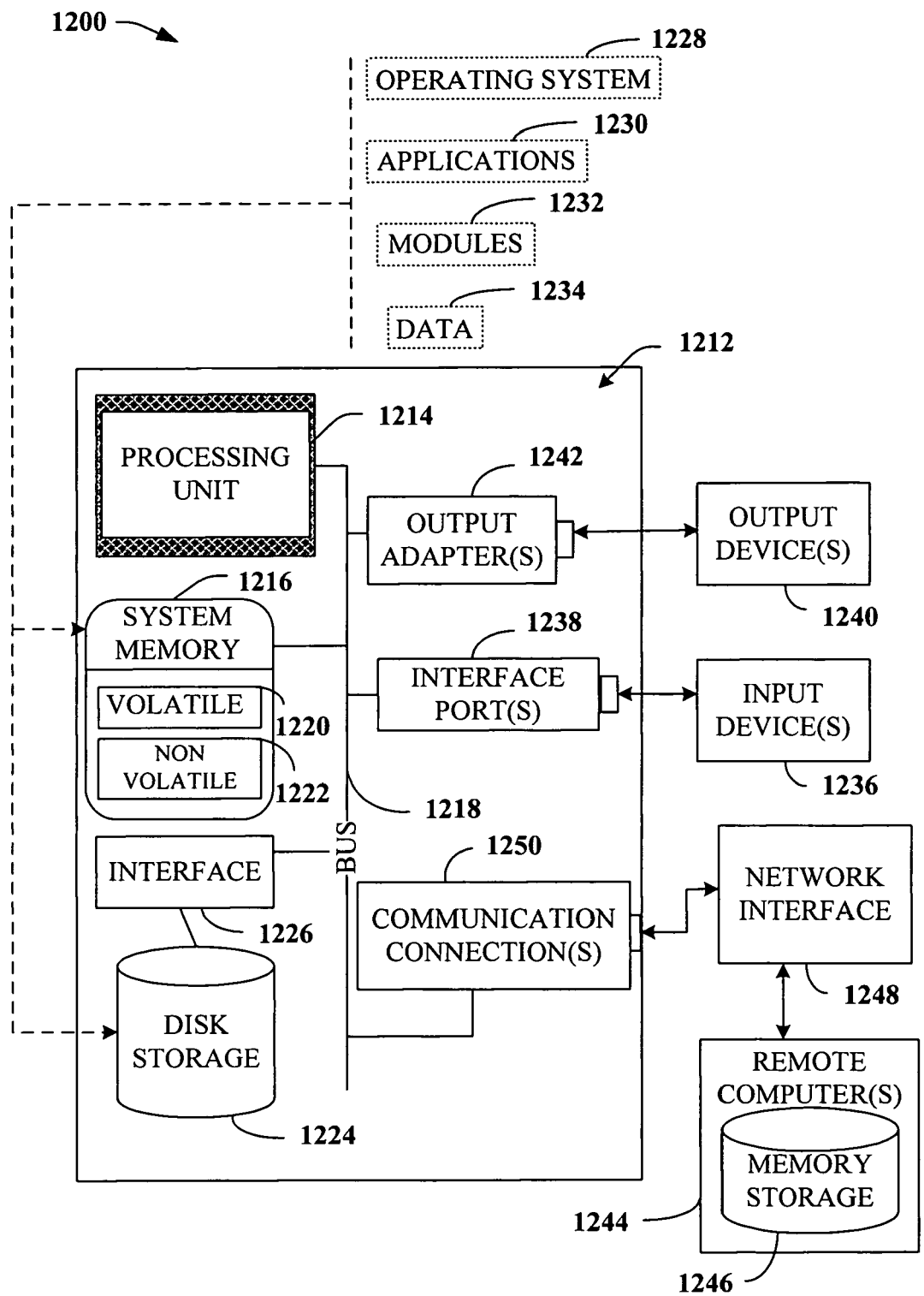
FIG. 12 illustrates an exemplary operating environment.

In order to provide additional context for implementation, FIGS. 11-12 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 11 is a schematic block diagram of a sample-computing environment 1100 within which the disclosed and described components and methods can be used. The system 1100 includes one or more client(s) 1110. The client(s) 1110 can be hardware and/or software (for example, threads, processes, computing devices). The system 1100 also includes one or more server(s) 1120. The server(s) 1120 can be hardware and/or software (for example, threads, processes, computing devices). The server(s) 1120 can house threads or processes to perform transformations by employing the disclosed and described components or methods, for example. Specifically, one component that can be implemented on the server 1120 is an update server, such as the update server 110 of FIG. 1. Another component that can be so implemented is the localization module 470 of FIG. 4. Additionally, various security modules, such as the security module 620 discussed in conjunction with FIG. 6, can also be implemented as components of the server 1120. Various other disclosed and discussed components can be implemented on the server 1120.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the server(s) 1140.

With reference to FIG. 12, an exemplary environment 1200 for implementing various components includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

The various types of volatile and non-volatile memory or storage provided with the computer 1212 can be used to store components of various implementations of the data port signaling system disclosed and described herein. For example, with reference to FIG. 1, the firmware 160 can be implemented as a software module that can be stored in the non-volatile memory 1222. At runtime, the firmware 160 can be loaded into the volatile memory 1220 from where machine-interpretable code of the firmware 160 can be accessed by the processing unit 1214 and thereby placed into execution.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the disclosed components and methods can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. The interface ports 1238 specifically can include various data connection ports that can be used with components disclosed and described herein, among others.

Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer executable system for updating firmware for a mobile computing device, comprising:
   a management object that includes identification and version information for a firmware component embodied on a computer readable storage medium of the mobile computing device;
   an update object that includes an update package that contains the identification and version information for the firmware component;
   an update server that accesses information from the management object and that based on the accessed information identifies the update package of the update object as an available update for the firmware component of the mobile computing device; and
   a localization component associated with the update server for automatically identifying the update package of the update object as an available update for the firmware component of the mobile computing device based at least in part on a location of the mobile computing device, the localization component employing an artificial intelligence based scheme comprising a trainable neural network to identify the update package as the available update from among a plurality of available update packages for the firmware component, the artificial intelligence based scheme of the localization component including a classifier, the classifier being a function mapping an input attribute vector to a confidence that the input belongs to a class, the input attribute vector including file descriptor attributes describing the firmware component of the mobile computing device, the classifier identifying the update package as the available update from among the plurality of available update packages based on the identified update packages providing a best fit to the firmware component as compared with other update packages from the plurality of available update packages.

2. The system of claim 1, further comprising an update module that accesses the identification and version information for the firmware component to determine whether a firmware component update package is available.

3. The system of claim 2, wherein the update object further includes a location of the firmware component update package.

4. The system of claim 1, wherein the update object package references a localized component.

5. The system of claim 1, further comprising a peer update module that compares information published by another mobile computing device with the information for the firmware component from the update object and determines whether an updated version of firmware is available from the another mobile computing device for the mobile computing device.

6. The system of claim 1, further comprising a localization module that identifies an update object that references localized content.

7. The system of claim 1, further comprising a security module that secures the update object for transmission.

8. A computer-implemented method for updating firmware components of a mobile computing device, comprising:
   employing a processor to execute the following computer executable acts to update firmware components on the mobile storage device:
   accessing information regarding currently installed firmware of the mobile computing device;
   comparing individual components of the accessed information to stored versions of firmware;

identifying, based at least in part upon the comparison, a firmware component update package as available updates for firmware components of the mobile computing device;

creating an update object in memory associated with the processor that includes information relating to the firmware component update packages; and identifying the update package as available updates for firmware components of the mobile computing device based at least in part on a location of the mobile computing device, including employing an artificial intelligence based scheme comprising a trainable neural network to identify the update package as the available update from among a plurality of available update packages for the firmware component, the artificial intelligence based scheme employing a classifier, the classifier being a function mapping an input attribute vector to a confidence that the input belongs to a class, the input attribute vector including file descriptor attributes describing the firmware component of the mobile computing device, the classifier identifying the update package as the available update from among the plurality of available update packages based on the identified update package providing a best fit to the firmware component as compared with other update packages from the plurality of available update packages.

9. The method of claim 8, wherein creating an update object includes at least one of providing a location of an update component or using localization information.

10. The method of claim 8, further comprising sending the update object to a mobile computing device.

11. The method of claim 10, wherein sending the update object to a mobile computing device includes at least one of digitally signing the update object or encrypting the update object.

12. The method of claim 10, further comprising sending the firmware component package to the mobile computing device.

13. The method of claim 9, wherein creating an update object includes using localization information.

14. A system for managing firmware components of a portable computing device, comprising:

means for accessing information regarding currently installed firmware embodied on a computer readable storage medium of the portable computing device, means for identifying, based at least in part upon the accessed information, an available firmware component update package as an available update for firmware components of the portable computing device;

means for creating in a memory associated with the computer hardware device an update object that includes information relating to the firmware component update package; and means for identifying the update package as available updates for firmware components of the mobile computing device based at least in part on a location of the mobile computing device, including employing an artificial intelligence based scheme comprising a trainable neural network to identify the update package as the available update from among a plurality of available update packages for the firmware component, the artificial intelligence based scheme employing a classifier, the classifier being a function mapping an input attribute vector to a confidence that the input belongs to a class, the input attribute vector including file descriptor attributes describing the firmware component of the mobile computing device, the classifier identifying the update package as the available update from among the plurality of available update packages based on the identified update packages providing a best fit to the firmware component as compared with other update packages from the plurality of available update packages.

15. The system of claim 14, wherein the means for creating an update object includes means for providing a location of an update component.

16. The system of claim 15, wherein the means for creating an update object includes means for sending the update object to a portable computing device.

17. The system of claim 16, wherein the means for sending the update object to a portable computing device includes at least one of means for digitally signing the update object or means for encrypting the update object.

18. The system of claim 16, wherein the means for sending the update object to a portable computing device includes means for sending the firmware component package to the portable computing device.

19. The system of claim 15, wherein the means for creating an update object includes means for using localization information.

20. The system of claim 3, wherein the location of the firmware component update package is a uniform resource identifier.

* * * * *